(12) United States Patent
Aikyo et al.

(10) Patent No.: US 11,345,641 B2
(45) Date of Patent: May 31, 2022

(54) ALUMINA FIBERS, ALUMINA FIBER AGGREGATE, AND RETAINING MATERIAL FOR USE IN EXHAUST GAS PURIFICATION DEVICE

(71) Applicant: Denka Company Limited, Chuo-Ku (JP)

(72) Inventors: Teruhiro Aikyo, Omuta (JP); Yasutaka Oshima, Omuta (JP); Hiroyuki Ohashi, Itoigawa (JP); Koichi Fuji, Itoigawa (JP); Yosuke Goto, Itoigawa (JP)

(73) Assignee: Denka Company Limited, Chuo-Ku (JP)

( * ) Notice: Subject to any disclaimer, the term of this patent is extended or adjusted under 35 U.S.C. 154(b) by 173 days.

(21) Appl. No.: 16/622,103

(22) PCT Filed: Oct. 19, 2018

(86) PCT No.: PCT/IB2018/058121
§ 371 (c)(1),
(2) Date: Dec. 12, 2019

(87) PCT Pub. No.: WO2019/038747
PCT Pub. Date: Feb. 28, 2019

(65) Prior Publication Data
US 2021/0094883 A1    Apr. 1, 2021

(30) Foreign Application Priority Data

Aug. 25, 2017 (JP) .............................. JP2017-162709

(51) Int. Cl.
*C04B 35/622* (2006.01)
(52) U.S. Cl.
CPC ................... *C04B 35/62236* (2013.01); *C04B 2235/3201* (2013.01); *C04B 2235/3208* (2013.01); *C04B 2235/3217* (2013.01); *C04B 2235/72* (2013.01)

(58) Field of Classification Search
CPC ...... C04B 35/62236; C04B 2235/3201; C04B 2235/3208; C04B 2235/3217; C04B 2235/72
See application file for complete search history.

(56) References Cited

U.S. PATENT DOCUMENTS

| 2004/0259718 | A1 | 12/2004 | Feige et al. | |
|---|---|---|---|---|
| 2005/0085369 | A1 | 4/2005 | Jensen | |
| 2015/0251163 | A1* | 9/2015 | Ohshima | B01J 21/12 |
| | | | | 502/439 |
| 2017/0137319 | A1 | 5/2017 | Iwata et al. | |

FOREIGN PATENT DOCUMENTS

| JP | 7-286514 A | 10/1995 | |
|---|---|---|---|
| JP | 10-292229 A | 11/1998 | |
| JP | 11-43826 A | 2/1999 | |
| JP | 11043826 A * | 2/1999 | ............... D01F 9/08 |
| JP | 2000-160434 A | 6/2000 | |
| JP | 2005-511471 A | 4/2005 | |
| JP | 2013-87756 A | 5/2013 | |
| WO | WO 2014/069589 A1 | 5/2014 | |
| WO | WO 2014/115814 A1 | 7/2014 | |
| WO | WO 2016/006164 A1 | 1/2016 | |

OTHER PUBLICATIONS

International Search Report dated Dec. 4, 2018 in PCT/IB2018/058121 filed on Oct. 19, 2018, citing references AA-AD and AO-AR therein, 2 pages.
Extended European Search Report dated Jun. 15, 2020 in corresponding European Patent Application No. 18848748.2 citing document AO therein, 7 pages.

* cited by examiner

*Primary Examiner* — Noah S Wiese
(74) *Attorney, Agent, or Firm* — Oblon, McClelland, Maier & Neustadt, L.L.P.

(57) ABSTRACT

The present invention relates to an alumina fiber having the content of sodium oxide of 530 to 3,200 ppm and a mass ratio (A/B) of the content (A) of the sodium oxide to the content (B) of calcium oxide of 5 to 116.

7 Claims, No Drawings

ALUMINA FIBERS, ALUMINA FIBER AGGREGATE, AND RETAINING MATERIAL FOR USE IN EXHAUST GAS PURIFICATION DEVICE

TECHNICAL FIELD

The present invention relates to an alumina fiber, an alumina fiber aggregate, and a gripping material for exhaust gas cleaner.

BACKGROUND ART

Inorganic fibers, such as an amorphous ceramic fiber, a crystalline alumina fiber, a rock wool, and a glass wool, are widely used as, for example, a thermal insulator of a heating furnace, while utilizing their excellent fire resistance and heat insulating properties. In addition, in the automobile component field, for the purpose of detoxifying NOx, PM, and the like contained in exhaust gases to be discharged from internal combustion engines of vehicle engines, an exhaust gas cleaner is used. The exhaust gas cleaner has a configuration where a catalyst support made of a ceramic or the like is housed in a catalyst casing having a structure of a metal-made shell or the like. In general, this configuration includes a gripping material (also called a holding material) interposed between the catalyst support and the catalyst casing. The gripping material has both a purpose of fixing the catalyst support to prevent any damages to be caused due to vibrations and a purpose of serving as an exhaust gas sealing material, and use of an alumina fiber aggregate is being the mainstream (see, for example, PTL 1).

PTL 2 discloses an alumina-based fiber which is capable of maintaining elasticity of a certain level or more for a long period of time even in the case where it is used as a gripping material for automobile in a severe usage environment, and an alumina-based fiber aggregate formed of the alumina-based fiber.

Meanwhile, since the alumina fiber is used at a high temperature for a long time, it is essential to have a high purity in order to maintain compression restorability or heat resistance.

PTL 3 discloses, as a thermal insulator of an industrial furnace, an alumina fiber mat which has large restorability and scarcely generates joint openings even after being used at a high temperature, and a product using the same. PTL 3 describes that the alumina fiber mat contains, as impurities, Na and K in a total amount of 300 ppm or less, Fe in an amount of 200 ppm or less, and Ca in an amount of 50 ppm or less.

PTL 4 discloses a glass fiber-containing mat as a mat material which is scarcely lowered in terms of a holding force, the mat containing 52 to 66% by weight of $SiO_2$, 9 to 26% by weight of $Al_2O_3$, 15 to 27% by weight of CaO, and 0 to 2% by weight of $Na_2O$ and $K_2$ in total and not substantially containing $B_2O_3$.

CITATION LIST

Patent Literature

PTL 1: JP 7-286514 A
PTL 2: WO 2014/115814 A
PTL 3: JP 2000-160434 A
PTL 4: JP 2013-87756 A

SUMMARY OF INVENTION

Technical Problem

The exhaust gas control was recently made stricter, and the exhaust gas cleaners have come to be required to have higher functions accordingly. Then, the alumina fiber aggregate that is a gripping material is assumed to be used under a severer use condition. Under such a condition, it is required to maintain a high areal pressure against the catalyst support, namely a high holding force. In addition, when the holding force against the catalyst support is scattered on the holding surface, a pressure difference due to scattering of the so-called areal pressure is generated, and there is a case where the catalyst support cannot be held under a severer condition. In consequence, what the scattering of the areal pressure is small will also be required in the future.

Here, PTLs 2 to 4 pay attention to only the compression restorability or heat resistance and are insufficient regarding a reduction of the scattering of the areal pressure. Thus, more improvements were needed.

In the light of the above, an object of the present invention is to provide an alumina fiber capable of forming an alumina fiber aggregate which on forming as a gripping material of an exhaust gas cleaner, has a sufficient holding force against a catalyst support and is able to reduce a scattering of the areal pressure.

Solution to Problem

In order to solve the aforementioned problem, the present inventors made investigations. As a result, it has been found that the generation of a lowering of the areal pressure of the alumina fiber aggregate is caused due to locally vulnerable sites originated from the production condition of the alumina fiber aggregate, such as pores and defects. According to the findings of the present inventors, the lowering in the areal pressure is caused when stress is imposed on the fibers, and these vulnerable sites serve as starting points to readily fracture the fibers. In addition, it has been found that the scattering of the areal pressure is related to uniformity of an alumina fiber texture to be caused due to a specified component existing in the alumina fiber aggregate.

In consequence, the present inventors have considered that in order to prevent the occurrence of a lowering of the areal pressure which the alumina fiber aggregate originally has, it is needed to reduce a defect of the alumina fiber aggregate and to unify the texture regarding the scattering of the areal pressure.

Then, the present inventors made investigations for unifying the texture of the alumina fiber aggregate. As a result, they have found an alumina fiber aggregate capable of not only holding a catalyst support with a high holding force but also reducing the scattering of the areal pressure as a gripping material for exhaust gas cleaner by controlling the amount of sodium oxide in the alumina fiber and a content ratio of sodium oxide to calcium oxide. Specifically, the present invention is as follows.

[1] An alumina fiber having the content of sodium oxide of 530 to 3,200 ppm and a mass ratio (A/B) of the content (A) of the sodium oxide to the content (B) of calcium oxide of 5 to 116.

[2] The alumina fiber as set forth in [1], wherein the content of alumina in terms of a chemical composition is 63% by mass or more and less than 97% by mass.

[3] The alumina fiber as set forth in [1] or [2], having a mullitization ratio of 10% or less.

[4] An alumina fiber aggregate, which is formed of the alumina fibers as set forth in any one of [1] to [3].

[5] A gripping material for exhaust gas cleaner, which is formed of the alumina fiber aggregate as set forth in [4].

Advantageous Effects of Invention

In accordance with the present invention, it is possible to provide an alumina fiber capable of forming an alumina fiber aggregate which on forming as a gripping material of an exhaust gas cleaner, not only has a sufficient holding force against a catalyst support but also is able to reduce scattering of the areal pressure.

Then, since the alumina fiber aggregate formed of the alumina fibers of the present invention is extremely small in terms of a scattering of a holding force (scattering of the areal pressure) on the holding surface, it is suitable as a gripping material for exhaust gas cleaner of an automobile or the like.

In addition, since such an alumina fiber aggregate is obtainable utilizing a simple production method using a conventional apparatus, it is good in terms of production efficiency.

DESCRIPTION OF EMBODIMENTS

Each of embodiments of the alumina fiber, the alumina fiber aggregate, and the gripping material of the present invention is hereunder described in detail. In this specification, the wording "areal pressure" means a "holding force against the catalyst support", and the wording "scattering of the areal pressure" means "scattering of the holding force on the holding surface of the catalyst support". In addition, "part", "%", and "ppm" are on a mass basis unless specifically indicated.

(Alumina Fiber)

In the alumina fiber of the present embodiment, the content of sodium oxide is 530 to 3,200 ppm. When the content is less than 530 ppm, the texture becomes ununiform, and the scattering of the areal pressure becomes large. When the content of sodium oxide is more than 3,200 ppm, the scattering of the areal pressure becomes large, and the heat resistance as the gripping material for automobile is lowered. The content of sodium oxide is preferably 590 to 2,480 ppm, and more preferably 640 to 2,160 ppm. The sodium content as sodium oxide and the calcium content as calcium oxide can be measured by means of the ICP measurement after microwave acidolysis, as described in the section of Examples as mentioned later. Then, these contents can be determined by expressing the measured values in terms of sodium oxide and calcium oxide, respectively.

In the alumina fiber of the present embodiment, a mass ratio (A/B) of the content (A) of sodium oxide to the content of calcium oxide is 5 to 116. When the mass ratio is less than 5 or more than 116, the scattering of the areal pressure becomes large. The mass ratio is preferably 7 to 51, and more preferably 8 to 39.

In the alumina fiber of the present embodiment, the content of $Al_2O_3$ in terms of a chemical composition thereof is 63% by mass or more and less than 97% by mass. When the content is less than 97% by mass, the sufficient fiber strength and areal pressure can be maintained. Meanwhile, when it is 63% by mass or more, favorable heat resistance is exhibited, and on the occasion of using as a gripping material for automobile exhaust gas, the degradation of the fiber to be caused due to a high-temperature exhaust gas can be prevented from occurring. As the chemical composition of the alumina fiber aggregate, the content of $Al_2O_3$ is preferably 70 to 93% by mass, and more preferably 73 to 90% by mass.

In the alumina fiber of the present embodiment, $SiO_2$, $Fe_2O_3$, MgO, CuO, ZnO, and the like may be contained as components other than $Al_2O_3$, $Na_2O$, and CaO. Above all, it is preferred that the alumina fiber contains $SiO_2$, and it is especially preferred that the alumina fiber is constituted to contain two components of $Al_2O_3$ and $SiO_2$. In the case where the alumina fiber is constituted to contain $SiO_2$, the growth of a coarse crystal of α-alumina is suppressed, and the areal pressure is improved.

The chemical composition of the alumina fiber can be measured by means of fluorescent X-ray analysis, ICP, or the like.

As a mineral composition of the alumina fiber of the present embodiment, a proportion of mullite $(3Al_2O_3 \cdot 2SiO_2)$, namely a mullite ratio is preferably 10% or less. When the mullite ratio is 10% or less, the fiber strength and the areal pressure can be made in increased states. The mullite ratio is more preferably 1 to 5%.

It is possible to identify and quantitatively determine the mullite ratio of the alumina fiber of the present embodiment by means of X-ray powder diffractometry. Details thereof are hereunder described.

The measurement is made with an X-ray diffractometer (for example, MULTIFLEX, manufactured by RIGAKU Corporation) under a condition of a tube voltage of 30 kV, a tube current of 40 mA, and a speed of 2°/min, and a height h of a peak of mullite at 2θ=40.9° is read out. In addition, under the same condition, a mullite standard substance (for example, a standard substance JCRM-R041, certified by the Ceramic Society of Japan) is measured, and a peak height $h_0$ at 2θ=40.9° is read out. The mullite ratio in this analysis is a value represented by the equation (1).

Mineralogical composition (mullite ratio)=$h/h_0 \times 100$    Equation (1):

As for the foregoing alumina fiber of the present embodiment, for example, it is preferred that this is accumulated and molded in a sheet-like or mat-like form and used for a gripping material for catalyst support, a refractory, or the like, and it is more preferred that the alumina fiber is used for a gripping material for catalyst support.

(Alumina Fiber Aggregate)

The alumina fiber aggregate of the present embodiment is formed of the alumina fibers of the present invention.

In the case of being used as the gripping material for catalyst support, the alumina fiber aggregate of the present embodiment is introduced, generally in a state of having been compressed to a bulk density in a range of 0.3 to 0.5 g/cm³, into a catalyst casing, such as a metal-made shell, in which a catalyst support made of a ceramic has been housed. If a sufficiently high areal pressure is not retained within this bulk density range, there is a concern that the holding force is insufficient, and the catalyst support made of a ceramic is damaged by vibrations during the use. Accordingly, in order to make usable as a gripping material for exhaust gas cleaner of an automobile or the like in which vigorous vibrations are generated, besides the areal pressure, a scattering of the areal pressure (CV value) is preferably less than 3.0.

The areal pressure and the scattering of the areal pressure as referred to in the present embodiment can be measured by using a tension compression tester. A method for the measurement is hereunder described in detail.

For the measurement, for example, Autograph, manufactured by Shimadzu Corporation is preferably used as the tension compression tester. The alumina fiber aggregate is punched out to a columnar shape having a bottom area of 10.18 cm$^2$ and a length of 36 mm and compressed at a test speed of 10 mm/min. A repulsive force when the bulk density has been 0.4 g/cm$^3$ is measured. By multiplying each repulsive force by the bottom area, the areal pressure can be determined.

The scattering value of the areal pressure is calculated by dividing an average value of the areal pressure at 10 points by a standard deviation.

A method for producing the alumina fiber aggregate having the aforementioned properties is hereunder described in detail.

That is, for example, the method for producing the alumina fiber aggregate of the present embodiment includes:

(I) a step of mixing an inorganic fiber source containing an alumina source, a silica source, a sodium oxide source, and a calcium oxide source with a spinning aid and concentrating the mixture under reduced pressure, to obtain a viscous spinning dope;

(II) a step of extruding the spinning dope through pores into the air and drying, to obtain an alumina fiber precursor; and (III) a step of firing the alumina fiber precursor.

Step of (I):

As a method of preparing a spinning dope of the alumina fiber, an alumina source, a silica source, a sodium oxide source, and a calcium oxide source are mixed such that the alumina fiber finally has a desired chemical composition, the mixture is further blended with a spinning aid, such as polyvinyl alcohol, polyethylene oxide, and polyethylene glycol, and the blend is uniformly mixed, followed by concentration under reduced pressure. According to this, a viscous spinning dope having a viscosity of preferably 500 mPa·s or more and 10,000 mPa·s or less, and more preferably 1,000 mPa·s or more and 5,000 mPa·s or less is prepared.

Here, examples of the alumina source include aluminum oxychloride and aluminum propoxide. Examples of the silica source include a silica sol (colloidal silica) and a polyether-modified silicone. Examples of the sodium oxide source include sodium hydroxide and water glass. Examples of the calcium oxide source include calcium hydroxide.

There is a tendency that when the viscosity of the spinning dope is low, the diameter of the resulting alumina fiber becomes small, whereas when the viscosity of the spinning dope is high, the diameter of the fiber becomes large. At this time, when the viscosity of the spinning dope is 500 mPa·s or more, cutting of the fiber on the way can be prevented from occurring, whereas when it is 10,000 mPa·s or less, the fiber diameter does not become excessively large, and sipping can be smoothly performed.

In the case where the tackifier is polyvinyl alcohol, its polymerization degree is preferably 1,000 or more and 2,500 or less, and more preferably 1,600 or more and 2,000 or less. Its concentration is preferably 6 parts by mass or more and 12 parts by mass or less based on 100 parts by mass of a sum total of solid contents of the alumina component and the silica component. When the concentration is 6 parts by mass or more, favorable spinnability is exhibited, and fusion-bonded fibers can be minimized. In addition, when the concentration is 12 parts by mass or less, the spinning dope becomes low in the viscosity and is likely concentrated, and thus, a spinning dope with good spinnability can be prepared. In the case where the preparation condition of the spinning dope is appropriately varied in this way, the final diameter of the alumina fiber can be allowed to fall within a preferred range.

In the case where the tackifier is polyethylene oxide, its molecular weight is preferably 150,000 or more and 900,000 or less, and more preferably 300,000 or more and 600,000 or less. Its concentration is preferably 2 parts by mass or more and 6 parts by mass or less based on 100 parts by mass of a sum total of solid contents of the alumina component and the silica component. When the concentration is 2 parts by mass or more and 6 parts by mass or less, favorable spinnability is exhibited, and fusion-bonded fibers can be minimized.

In the case where the tackifier is polyethylene glycol, its molecular weight is preferably 3,000 or more and 20,000 or less, and more preferably 4,500 or more and 9,000 or less. Its concentration is preferably 6 parts by mass or more and 14 parts by mass or less based on 100 parts by mass of a sum total of solid contents of the alumina component and the silica component. When the concentration is 6 parts by mass or more and 14 parts by mass or less, favorable spinnability is exhibited, and fusion-bonded fibers can be minimized.

Step of (II):

Examples of a method of obtaining an alumina fiber precursor from the spinning dope include a method in which the spinning dope is ejected in a filamentous state into the air from pores of a molding die and rapidly dried. There are no particular limitations in the structure or shape of the molding die, the diameter or arrangement of the pores, the discharge amount or discharge pressure of the spinning dope, and the space temperature, pressure, gas component, humidity, and presence or absence of an air flow in the target into which the spinning dope is ejected. The molding die may be a fixed structure or may have a movable structure. Specifically, the alumina fiber precursor can be obtained by supplying the spinning dope into a hollow disk rotating at a circumferential velocity of 5 m/s or more and 100 m/s or less, ejecting the spinning dope in a radial form (filamentous form) from a plurality of pores which are provided on the circumferential surface of the disk and have a diameter of 0.1 mm or more and 1.3 mm or less, and rapidly drying it while bringing into contact with dry air.

In the method of using the rotating disk, the amount of the spinning dope to be discharged from one pore depends on the size of the disk, the pore diameter, the number of pores, the viscosity of the spinning dope, or the like, but a practical range thereof is preferably 5 mL/h or more and 100 mL/h or less. When the discharge amount is 5 mL/h or more, the diameter of the fiber does not become excessively small, and flying of fibers can be prevented from occurring. In addition, when the discharge amount is 100 mL/h or less, the matter that the diameter becomes excessively large, and thus, the fiber becomes rigid can be prevented from occurring, and the matter that the number of broken fibers is increased so that the performance of maintaining elasticity of the alumina fiber aggregate for a long period of time is lowered can be prevented from occurring.

The temperature of the dry air is preferably in a range of 10° C. or higher and 200° C. or lower. When the temperature of the dry air is 10° C. or higher, drying of the alumina fiber precursor is sufficient, yarn cutting or fusion bonding of the fibers to each other can be reduced. In addition, when the temperature of the dry air is 200° C. or lower, the drying does not overly advance rapidly, and the yarn is readily extended, and therefore, the fiber does not become excessively thick, and handling properties of the fiber precursor in a post step can be improved.

Subsequently, the dried alumina fiber precursor is accumulated and molded in the form of a sheet or a mat. Examples of a method of accumulating and molding include a method of naturally dropping the alumina fiber precursor which is ejected into the air during spinning, from above into a mold frame while being allowed to float in the air to be accumulated, thereby shaping into the form of a sheet or a mat. At this time, it is possible to make the density higher by mechanically compressing the alumina fiber precursor accumulated, suctioning from below the mold frame, or the like. In addition, a portion corresponding to a pedestal on the occasion of accumulating and molding the alumina fiber precursor may have a fixed structure or a movable structure, such as a belt conveyor. It is preferred in terms of the quality management that the alumina fiber precursor accumulated and molded is held at 10° C. or higher and 150° C. or lower before being sent to a heating furnace.

Step of (III):

As a method of firing the alumina fiber precursor which has been accumulated and molded in the form of a sheet or a mat, to finally obtain an aggregate formed of the alumina fibers, for example, as a first stage, this alumina fiber precursor is heated in an air atmosphere from the temperature after accumulation and molding, namely, typically 10° C. or higher and 150° C. or lower, to 500° C. or higher and 1,000° C. or lower as a maximum temperature. At this first stage, a degreasing process of drying moisture remaining in the alumina fiber precursor to discharge a volatile acidic component, such as hydrogen chloride, and an organic substance, such as an aldehydes that is a decomposition product of the tackifier, is provided.

Furthermore, as a second stage, a crystallization process of firing the alumina fiber precursor by setting a maximum temperature to 1,000° C. or higher and 1,300° C. or lower in an air atmosphere, thereby crystallizing a part of the inorganic compound, is provided.

For each of the degreasing process and the crystallization process, there are adopted a method in which the treatment is performed using a different heating furnace from each other; and a method in which in the case of the same furnace, the treatment is performed by changing the heating condition or the like. As the heating furnace, a continuous furnace that transports the alumina fiber precursor by using a belt conveyor, a roller, or the like, or a batch type furnace can be suitably used.

It may be promptly transitioned from the degreasing process to the crystallization process, or transitioned after a certain time interval, but in general, a method of promptly transitioning is adopted when the productivity is taken into consideration.

The temperature of the degreasing process and the crystallization process of the present invention is a measured value of the ambient temperature in the heating furnace. In this case, the temperature is typically measured by a thermocouple or the like installed in the heating furnace.

Here, a structure allowing introduction of hot air and discharge of volatile components is suitable when used as the heating furnace during the degreasing process. A maximum temperature during the degreasing process is set to 500° C. or higher and 1,000° C. or lower, and preferably 650° C. or higher and 1,000° C. or lower. In the case where the temperature is set to 500° C. or higher, it is free from the matter that the process is transitioned to the crystallization process in a state in which degreasing is insufficient, and a phenomenon in which the specific surface area becomes greater is observed, and fibers become easily broken due to increased defects of the alumina fiber can be prevented from occurring. In addition, crystallization of mullite concurrently advances also during the degreasing process, and therefore, by setting the temperature to 1,000° C. or lower, the matter that the size of its crystallite is increased so that fibers become rigid can be prevented from occurring. In addition, in the case where the temperature is set to 500° C. or higher and 1,000° C. or lower, a lowering of the shape restorability with respect to compression deformation can be prevented from occurring.

In the case where the temperature is increased from the temperature before the accumulated and molded fiber precursor is heated, that is, a temperature of 10° C. or higher and 150° C. or lower, and preferably 20° C. or higher and 60° C. or lower, to a temperature of 500° C. or higher to 1,000° C., and preferably 650° C. or higher and 1,000° C. or lower in a heating furnace, the temperature may be increased continuously or increased stepwise until the temperature reaches the maximum temperature. But, an average temperature rise rate during that time period is preferably 1° C./min or more and 50° C./min or less, and more preferably 2° C./min or more and 30° C./min or less. When the average temperature rise rate is 50° C./min or less, a fiber which becomes highly defective because the volume of the fiber is contracted while volatilization of moisture or acidic components or decomposition of the tackifier does not sufficiently occur is not formed, and thus, the fiber is able to favorably exhibit the properties. In addition, when the average temperature rise rate is 1° C./min or more, the heating furnace is not required to be unnecessarily made large.

Although the time required for the degreasing process is not particularly limited, it is preferably 20 minutes or more and 60 minutes or less, and preferably 30 minutes or more and 30 minutes or less. When the time is 20 minutes or more, the removal of the volatile components becomes sufficient, and when the degreasing process is held for 60 minutes, the volatile components are almost completely removed. The removal effect is not improved anymore even when the time is more than 60 minutes.

As for the heating furnace to be used in the crystallization process, a structure having an electric heating system using a heating element is preferably used, and by changing the maximum temperature of the crystallization process, it is possible to control the crystal morphology of the inorganic component contained in the alumina fiber. In the crystallization process, in order to achieve a heat resistant temperature and excellent elasticity suitable especially for the gripping material of an exhaust gas cleaner, a maximum temperature in the crystallization process is 1,000° C. or higher and 1,300° C. or lower, preferably 1,100° C. or higher and 1,250° C. or lower, and more preferably 1,150° C. or higher and 1,300° C. or lower. When the maximum temperature is 1,000° C. or higher, the alumina fiber is not lowered in terms of heat resistance and can be made suitable for the use temperature of the gripping material in the exhaust gas cleaner. On the other hand, where the maximum temperature is 1,300° C. or lower, the matter that crystallization of the alumina fiber, such as mullite, excessively advances can be prevented from occurring, and a lowering of the fiber strength can be prevented from occurring.

The temperature may be increased continuously or increased stepwise until reaching the maximum temperature. Although the average temperature rise rate until reaching the maximum temperature is largely affected by the structure of the heating furnace or the temperature of the alumina fiber before the crystallization process is carried out, in general, it is suitably 1° C./min or more and 120° C./min or less. When the average temperature rise rate is 1° C./min or more, a long time is not required for the temperature rise, and when it is 120° C./min or less, control of a heater, or the like becomes easy.

Although the heating time varies with the temperature rise rate and is not particularly limited, in general, it is preferably 5 minutes or more and 120 minutes or less, and more preferably 10 minutes or more and 60 minutes or less. When the holding time at the maximum temperature is 5 minutes or more, it is possible to allow the crystallization of the alumina fiber to sufficiently advance to prevent the generation of unevenness in a microstructure. In addition, when the holding time is 120 minutes or less, the matter that the crystallization excessively advances can be prevented from occurring. By controlling the holding time to 5 minutes or more and 120 minutes or less, the matter that the fiber strength is lowered, and the shape restorability of an aggregate formed of the alumina fibers is lowered can be prevented from occurring.

The alumina fiber after the crystallization process is finished needs to be rapidly cooled such that crystallization does not advance anymore. Although the method thereof is not particularly limited, in general, a method of taking out in the air atmosphere and naturally cooling at room temperature of 5° C. to 40° C., a method of blowing cooling air, or a method of bringing into contact with a cooled flat surface or a curved surface of a roll, etc. is suitably adopted.

In each of the degreasing process and the crystallization process, an apparatus to be used for firing is not particularly limited so long as the desired firing speed and exhaustion condition can be satisfied. For example, a batch furnace, such as a cantal furnace and a siliconit furnace, or a continuous furnace, such as a roller-hearth furnace and a mesh belt type furnace, can be suitably adopted. In addition, these firing apparatuses can be appropriately combined with each other and used, as the need arises.

The chemical composition of the alumina fiber of the present embodiment can be quantitatively determined by means of fluorescent X-ray analysis, ICP, or the like. In addition, the size of the crystallite of the inorganic compound can be identified and quantitatively determined by means of X-ray powder analysis.

It is confirmed through the fluorescent X-ray analysis and ICP analysis that the composition in which in the step of (I), the alumina fiber is blended such that it finally has the desired chemical composition substantially coincides with the chemical composition of the completed alumina fiber.

It is preferred that not only an average fiber diameter of the alumina fiber of the present invention falls within a range of 3.0 μm or more and 6.0 μm or less, but also a proportion of fibers having a fiber diameter of more than 10 μm is less than 5% in terms of the number of fibers. When the average fiber diameter is 3.0 μm or more, health hazard to be caused due to suction of fibers that are liable to fly can be suppressed, and when it is 6.0 μm or less, a lowering of restorability against deformation can be suppressed without impairing the flexibility of the fiber. In addition, when the proportion of fibers having a fiber diameter of more than 10 μn is less than 5% in terms of the number of fibers, an alumina fiber aggregate that maintains appropriate elasticity for a long period of time can be obtained.

The measurement value of the fiber diameter of the alumina fiber is a value acquired by collecting fiber samples from the completed alumina fiber aggregate, providing a measuring device for a two-dimensional image of one fiber observed by a microscope, and correcting the magnification thereof. At this time, the value becomes closer to a true value when the number of sample fibers used for measuring the fiber diameter is greater, but it is usually from 100 to 500 fibers. Although there is a case where plurality fibers are rarely fused to each other, such fibers are excluded.

The alumina fiber aggregate of the present invention can be used as a gripping material for exhaust gas cleaner, and in particular, it is suitable as a gripping material for automobile exhaust gas cleaner. In addition, besides, the alumina fiber aggregate of the present invention can be used as an insulator against heat or sound, a filler of a plastic or film, or the like, a reinforcing material, or a stiffener for improving the tensile strength or abrasion strength.

(Gripping Material)

The present invention is concerned with a gripping material for exhaust gas cleaner using the alumina fiber aggregate of the present invention. That is, the present invention is concerned with a gripping material for exhaust gas cleaner formed of the alumina fiber aggregate. For example, by adding an inorganic binder or an organic binder to the alumina fiber aggregate of the present invention and wet molding the resultant, it is possible to produce the gripping material for exhaust gas cleaner.

In order to grip a honeycomb type catalyst within a catalyst casing by using the gripping material of the present invention, for example, the following manner may be adopted. That is, the gripping material is wound in a uniform thickness around the entirety of the honeycomb type catalyst, and the resultant is housed in the catalyst casing and then fixed upon being brought into intimate contact with the inner wall of the casing owing to a restoring force of the gripping material.

EXAMPLES

The present invention is hereunder described in more detail with reference to the results of evaluation tests by using Examples and Comparative Examples.

Example 1

5,000 g of an aluminum oxychloride aqueous solution having an alumina solid content concentration of 20.0% by mass, 2,840 g of colloidal silica having a silica concentration of 20.0% by weight, 0.10 g of sodium hydroxide (a special grade chemical, manufactured by Wako Pure Chemical Industries, Ltd.), and 0.004 g of calcium hydroxide (a special grade chemical, manufactured by Wako Pure Chemical Industries, Ltd.) were mixed such that the content of the alumina component was 64% by mass, the content of the silica component was 33% by mass, the content of the sodium oxide component was 0.32% by mass, and the content of the calcium oxide component was 0.05% by mass, and further mixed with 1,342 g of an aqueous solution containing partially saponified polyvinyl alcohol (manufactured by Denka Company Limited) having a polymerization degree of 1,700 in a solid content concentration of 10% by mass such that the content thereof was 8% by mass relative to the total solid content of the alumina component and the silica component, followed by being dehydrated and concentrated under reduced pressure, thereby preparing a spinning dope having a viscosity of 3,300 mPa·s.

This spinning dope was supplied into a disk such that a stock solution was discharged from 300 pores each having a diameter of 0.2 mmϕ which were provided at equal intervals on the circumferential surface of a hallow disk having a diameter of 350 mmϕ, and that the discharge amount was 25 mL/h per pore, and the spinning dope was radially ejected from the pores by rotating the disk at a circumferential velocity of 47.6 m/sec. The stock solution scattered from the pores was dried while being allowed to float and drop in hot air which was adjusted in a range of 145±5° C., thereby obtaining a fiber precursor. This fiber precursor was accumulated and molded in the form of a mat in a square frame having a length of 1 m and a width of 1 m in a cotton-collecting chamber with a system of suctioning from below, thereby obtaining an accumulated and molded body.

This accumulated and molded body of the alumina fiber precursor in the form of a mat was cut out in a size of a length of 15 cm, a width of 15 cm, and a height of approximately 15 cm and heated in an air atmosphere by using a batch type siliconit furnace. At that time, a degreasing process in which the temperature of the accumulated and molded body of the alumina fiber precursor was from 25° C. to 800° C. was performed while the gas was exhausted at 1.5 Nm³/h for 1 kg of the fiber precursor, and the temperature was continuously raised at 3° C./min and raised to 800° C. The time required until this process was approximately 260 minutes. Thereafter, the exhaustion was stopped at 800° C., and the process was promptly transitioned to a crystallization process, and in the crystallization process until 1,200° C., the temperature was raised at a temperature rise rate of 20° C./min for approximately 20 minutes. Further, the temperature was held at 1,200° C. that was the maximum temperature at that time, for 30 minutes. Then, the alumina fiber aggregate was promptly taken out to a chamber at a temperature of approximately 23° C. and left to naturally cool down in an air atmosphere. The temperature was measured by a thermocouple installed in the siliconit furnace.

The chemical composition (concentration, % by mass) of the alumina fiber aggregate of Example 1, which was left to naturally cool down, was measured in conformity with JIS R2216:2005 (fluorescent X-ray analysis method of refractory products), and based on the following method in detail. That is, 0.5 mL of a peeling accelerator (a 30% by mass lithium iodide aqueous solution) was charged in a gold-platinum bead pan (Pt/Au=95/5). 6.0 g of lithium tetraborate and 0.3 g of an alumina fiber after precisely weighed up to a unit of 0.1 mg were further charged. Then, a specimen for measurement (glass bead) was prepared by using an automatic bead-melting apparatus (ABS-II, manufactured by Rigaku Corporation) at a melting temperature of 1,200° C. for a melting time of 20 minutes and a cooling time of 20 minutes. This was measured for fluorescent X-ray strength of silicon dioxide ($SiO_2$) and aluminum oxide ($Al_2O_3$) under the following condition by using a fluorescent X-ray measuring device (ZSX100e, manufactured by Rigaku Corporation).

The concentration of each component was measured from a calibration curve which had been prepared in advance by measuring refractory standard substances JRRM304, JRRM305, JRRM306, JRRM307, JRRM308, JRRM309, and JRRM310 (distributed by OKAYAMA CERAMICS RESEARCH FOUNDATION through entrustment from refractory technology association) for fluorescent X-ray analysis. However, as for the concentration of silicon dioxide, the measurement value was used as it was, and as for aluminum oxide, the concentration calculated by the following equation in consideration of ignition ashing loss (ig. loss: 0.1% by mass)) was used. The number of specimen for measurement is one.

Concentration of aluminum oxide (mass %)=100 (mass %)−{Concentration of silicon dioxide (mass %)}−{Concentration of calcium oxide (mass %)}−{Sodium oxide (mass %)}−0.1 (mass %)

The refractory standard substance JRRM307 for fluorescent X-ray analysis was measured for every time before the measurement, and the measurement was made after adjusting a fluorescent X-ray measuring device in the case where the measurement value of silicon dioxide was out of the range of the (standard value±0.08) (mass %).

Sodium oxide ($Na_2O$) and calcium oxide (CaO) were measured according to the following method. To 0.25 g of a sample, 4 mL of 95% by mass sulfuric acid, 4 mL of 85% by mass phosphoric acid, and 0.5 mL of 48% by mass hydrofluoric acid were added, and the mixture was subjected to a microwave acidolysis pretreatment, thereby converting the sample into a solution. The ICP measurement (a device name: ICPE-9000, manufactured by Shimadzu Corporation) was performed to calculate the Na and Ca contents (ppm) in the alumina fiber. Then, these contents can be determined by expressing the calculated values in terms of sodium oxide ($Na_2O$) and calcium oxide (CaO), respectively.

The size of the mullite crystallite contained in each of the fibers constituting the alumina fiber aggregate of Example 1, which was left to naturally cool down, was obtained by measuring a diffraction peak under a condition described below by using the fiber sample pulverized in the following manner and also using a powder X-ray diffraction device (Ultima IV, manufactured by Rigaku Corporation), thereby acquiring the full width half maximum of a peak having a 2θ angle of 40.9°, which particularly corresponds to the surface of the mullite crystal (1.2.1), and calculating the size of the crystallite. The size of the crystallite was obtained in accordance with the Scherrer method by using an X-ray powder integrated analysis software (TDXL2, ver. 2.0.3.0, manufactured by Rigaku Corporation). The number of specimens is one.

The pulverized fiber sample was prepared by charging 15 g of the prepared alumina fiber aggregate in a 50 mmφ mold, and repeatedly applying 28 kN of a load thereto twice by using a hydraulic press machine (Tester 25, manufactured by FOREVER Co., Ltd. (former name: Machina Co., Ltd.)) to compress and pulverize the fiber.

Wavelength of X-ray: CuKα rays (wavelength: 1.54178 Å)
X-ray tube voltage and current: 40 V, 50 mA
Range of measured angle 2θ: 10 to 50°
Scanning speed: 4°/min The holding force and the scattering of areal pressure of the alumina fiber aggregate of Example 1 were determined in the following manner.

The measurement was performed by using an autograph tensile compression tester, manufactured by Shimadzu Corporation (a device name: AGS-X 5 kN). Sampling for measurement was performed at 5 points in intervals of 100 mm of the length and at 2 points in intervals of the width (10 points in total) from the alumina fiber aggregate having a length of 600 mm and a width of 300 mm. The alumina fiber aggregate was punched out to a columnar shape having a bottom area of 10.18 cm² and a length of 36 mm and compressed at a test speed of 10 mm/min and a weight of 0.75 g. A repulsive force when the bulk density had been 0.4 g/cm³ was measured (sample height: 1.83 mm). By multiplying each repulsive force by the bottom area, the areal pressure was determined.

The scattering value of the areal pressure was calculated by dividing an average value of the areal pressure at 10 points by a standard deviation.

Scattering value of areal pressure (CV value)=(Average value)/(Standard deviation (σ))

The composition of alumina fiber, the operating condition during production, and the evaluation results are shown in the following Table 1.

Examples 2 to 18 and Comparative Examples 1 to 8

Alumina fiber aggregates were prepared under the same conditions as in Example 1, except for changing the blend composition of the spinning dope and the temperature rise rate, the maximum firing temperature, and the required time in the crystallization process to those shown in the following Tables 1 to 7, and physical properties thereof were measured. The results are shown in the following Tables 1 to 7.

TABLE 1

| Item | | Unit | Example 1 | Example 2 | Example 3 | Example 4 |
|---|---|---|---|---|---|---|
| Alumina component | | % | 64.7 | 64.7 | 64.9 | 64.9 |
| Silica component | | % | 35.0 | 35.0 | 35.0 | 35.0 |
| Sodium oxide content A | | ppm | 3156 | 3156 | 680 | 680 |
| Calcium oxide content B | | ppm | 50 | 28 | 112 | 28 |
| A/B | | — | 63 | 113 | 6 | 24 |
| Crystallization process | Temperature rise rate | °C./min | 3 | 20 | 3 | 20 |
| | Maximum temperature | °C. | 1165 | 1165 | 1165 | 1165 |
| | Required time | min | 20 | 20 | 20 | 20 |
| Mullitization ratio | | — | 4 | 9 | 2 | 8 |
| Areal pressure | | kPa | 343 | 350 | 323 | 331 |
| Scattering of areal pressure (CV value) | | — | 2.4 | 2.7 | 2.3 | 2.5 |

TABLE 2

| Item | | Unit | Example 5 | Example 6 | Example 7 | Example 8 |
|---|---|---|---|---|---|---|
| Alumina component | | % | 71.9 | 71.9 | 71.7 | 71.7 |
| Silica component | | % | 28.0 | 28.0 | 28.0 | 28.0 |
| Sodium oxide content A | | ppm | 641 | 641 | 3056 | 3056 |
| Calcium oxide content B | | ppm | 112 | 28 | 50 | 28 |
| A/B | | — | 6 | 23 | 61 | 109 |
| Crystallization process | Temperature rise rate | °C./min | 3 | 20 | 3 | 20 |
| | Maximum temperature | °C. | 1200 | 1200 | 1200 | 1200 |
| | Required time | min | 20 | 20 | 20 | 20 |
| Mullitization ratio | | — | 2 | 5 | 3 | 6 |
| Areal pressure | | kPa | 423 | 420 | 442 | 451 |
| Scattering of areal pressure (CV value) | | — | 1.9 | 2.2 | 1.8 | 2.0 |

TABLE 3

| Item | | Unit | Example 9 | Example 10 | Example 11 | Example 12 |
|---|---|---|---|---|---|---|
| Alumina component | | % | 83.9 | 83.9 | 83.7 | 83.7 |
| Silica component | | % | 16.0 | 16.0 | 16.0 | 16.0 |
| Sodium oxide content A | | ppm | 592 | 592 | 2870 | 2870 |
| Calcium oxide content B | | ppm | 112 | 28 | 50 | 28 |
| A/B | | — | 5 | 21 | 57 | 103 |
| Crystallization process | Temperature rise rate | °C./min | 3 | 20 | 3 | 20 |
| | Maximum temperature | °C. | 1240 | 1240 | 1240 | 1240 |
| | Required time | min | 20 | 20 | 20 | 20 |
| Mullitization ratio | | — | 5 | 9 | 4 | 7 |
| Areal pressure | | kPa | 203 | 219 | 223 | 228 |
| Scattering of areal pressure (CV value) | | — | 2.1 | 2.4 | 2.1 | 2.3 |

TABLE 4

| Item | | Unit | Example 13 | Example 14 | Example 15 | Example 16 |
|---|---|---|---|---|---|---|
| Alumina component | | % | 90.9 | 90.9 | 90.7 | 90.7 |
| Silica component | | % | 9.0 | 9.0 | 9.0 | 9.0 |
| Sodium oxide content A | | ppm | 556 | 556 | 2540 | 2540 |
| Calcium oxide content B | | ppm | 112 | 28 | 50 | 28 |
| A/B | | — | 5 | 20 | 51 | 91 |
| Crystallization process | Temperature rise rate | °C./min | 3 | 20 | 3 | 20 |
| | Maximum temperature | °C. | 1260 | 1260 | 1260 | 1260 |
| | Required time | min | 20 | 20 | 20 | 20 |
| Mullitization ratio | | — | 4 | 8 | 3 | 9 |
| Areal pressure | | kPa | 170 | 175 | 185 | 165 |
| Scattering of areal pressure (CV value) | | — | 1.7 | 1.6 | 1.5 | 2.0 |

TABLE 5

| Item | | Unit | Example 17 | Example 18 |
|---|---|---|---|---|
| Alumina component | | % | 71.9 | 71.9 |
| Silica component | | % | 28.0 | 28.0 |
| Sodium oxide content A | | ppm | 641 | 641 |
| Calcium oxide content B | | ppm | 112 | 112 |
| A/B | | — | 6 | 6 |
| Crystallization process | Temperature rise rate | °C./min | 3 | 3 |
| | Maximum temperature | °C. | 1240 | 1290 |
| | Required time | min | 20 | 20 |
| Mullitization ratio | | — | 12 | 15 |
| Areal pressure | | kPa | 353 | 118 |
| Scattering of areal pressure (CV value) | | — | 2.9 | 2.8 |

TABLE 6

| Item | | Unit | Comparative Example 1 | Comparative Example 2 | Comparative Example 3 | Comparative Example 4 |
|---|---|---|---|---|---|---|
| Alumina component | | % | 71.9 | 71.7 | 71.7 | 71.9 |
| Silica component | | % | 28.0 | 28.0 | 28.0 | 28.0 |
| Sodium oxide content A | | ppm | 490 | 3234 | 3500 | 540 |
| Calcium oxide content B | | ppm | 60 | 25 | 60 | 160 |
| A/B | | — | 8 | 129 | 58 | 3 |
| Crystallization process | Temperature rise rate | °C./min | 3 | 20 | 3 | 20 |
| | Maximum temperature | °C. | 1200 | 1200 | 1200 | 1200 |
| | Required time | min | 20 | 3 | 20 | 3 |
| Mullitization ratio | | — | 3 | 5 | 3 | 5 |
| Areal pressure | | kPa | 433 | 432 | 444 | 428 |
| Scattering of areal pressure (CV value) | | — | 3.4 | 3.2 | 3.5 | 3.6 |

TABLE 7

| Item | | Unit | Comparative Example 5 | Comparative Example 6 | Comparative Example 7 | Comparative Example 8 |
|---|---|---|---|---|---|---|
| Alumina component | | % | 90.9 | 90.7 | 90.7 | 90.9 |
| Silica component | | % | 9.0 | 9.0 | 9.0 | 9.0 |
| Sodium oxide content A | | ppm | 490 | 3234 | 3500 | 540 |
| Calcium oxide content B | | ppm | 60 | 25 | 60 | 160 |
| A/B | | — | 8 | 129 | 58 | 3 |
| Crystallization process | Temperature rise rate | °C./min | 3 | 20 | 3 | 20 |
| | Maximum temperature | °C. | 1260 | 1260 | 1260 | 1260 |
| | Required time | min | 20 | 3 | 20 | 3 |

TABLE 7-continued

| Item | Unit | Comparative Example 5 | Comparative Example 6 | Comparative Example 7 | Comparative Example 8 |
|---|---|---|---|---|---|
| Mullitization ratio | — | 9 | 5 | 6 | 3 |
| Areal pressure | kPa | 161 | 175 | 180 | 179 |
| Scattering of areal pressure (CV value) | — | 3.3 | 3.5 | 3.6 | 4.0 |

The invention claimed is:

1. An alumina fiber, having:
 a content (A) of sodium oxide of 530 to 3,200 ppm; and
 a mass ratio (A/B) of the content (A) of sodium oxide to a content (B) of calcium oxide of 20 to 116.

2. The alumina fiber of claim 1, wherein a content of alumina in terms of a chemical composition is 63% by mass or more and less than 97% by mass.

3. The alumina fiber of claim 1, having a mullitization ratio of 10% or less.

4. An alumina fiber aggregate, comprising the alumina fiber of claim 1.

5. A gripping material, comprising the alumina fiber aggregate of claim 4.

6. The alumina fiber of claim 2, having a mullitization ratio of 10% or less.

7. An alumina fiber aggregate, comprising the alumina fiber of claim 2.

* * * * *